United States Patent [19]

Abdesselem et al.

[11] Patent Number: 5,353,288
[45] Date of Patent: Oct. 4, 1994

[54] DEVICE FOR SELECTING RECEPTION SIGNALS AS A FUNCTION OF THEIR POWER

[75] Inventors: Ouélid Abdesselem, Paris; Lydie Desperben, Bois Colombes, both of France

[73] Assignee: Alcatel N.V., Amsterdam, Netherlands

[21] Appl. No.: 753,295

[22] Filed: Aug. 30, 1991

[30] Foreign Application Priority Data

Sep. 3, 1990 [FR] France ................... 90 10940

[51] Int. Cl.$^5$ .......................................... H04B 7/212
[52] U.S. Cl. ..................... 370/95.1; 455/62; 375/100
[58] Field of Search ............ 455/52.1, 133, 134, 455/62; 375/40, 100; 370/50, 69.1, 70, 76, 95.1, 95.3, 77

[56] References Cited

U.S. PATENT DOCUMENTS

| | | | |
|---|---|---|---|
| 4,214,213 | 7/1980 | Ferrie | 375/100 |
| 4,365,347 | 12/1982 | Otsuka et al. | 455/52.1 |
| 4,715,048 | 12/1987 | Masamura | 375/100 |
| 4,765,753 | 8/1988 | Schmidt | 370/18 |
| 4,942,622 | 7/1990 | Takayama et al. | 455/52.1 |

FOREIGN PATENT DOCUMENTS 209185 1/1987 European Pat. Off. .
241954 10/1987 European Pat. Off. .

OTHER PUBLICATIONS

Ericsson Review, vol. 67, No. 2, '90; pp. 92-99; F. Lindell et al.; "Introduction of Digital Cellular Systems in North America".

*Primary Examiner*—Benedict V. Safourek
*Assistant Examiner*—Ajit Patel
*Attorney, Agent, or Firm*—Robbins, Berliner & Carson

[57] ABSTRACT

A device is provided for selecting reception signals as a function of their power, the reception signals being identified by their frequency and being structured into frames made up by a number of time slots. Power is calculated for each one of the signals being explored using as a basis measurements carried out on several selected time slots that correspond to the signal during a series of repetitive analysis periods. The selected time slot of the first signal explored during an analysis period bearing a number less than or equal to the number of time slots that make up a frame occupies a different position in the frame from the positions that it occupied during preceding analysis periods.

11 Claims, 1 Drawing Sheet

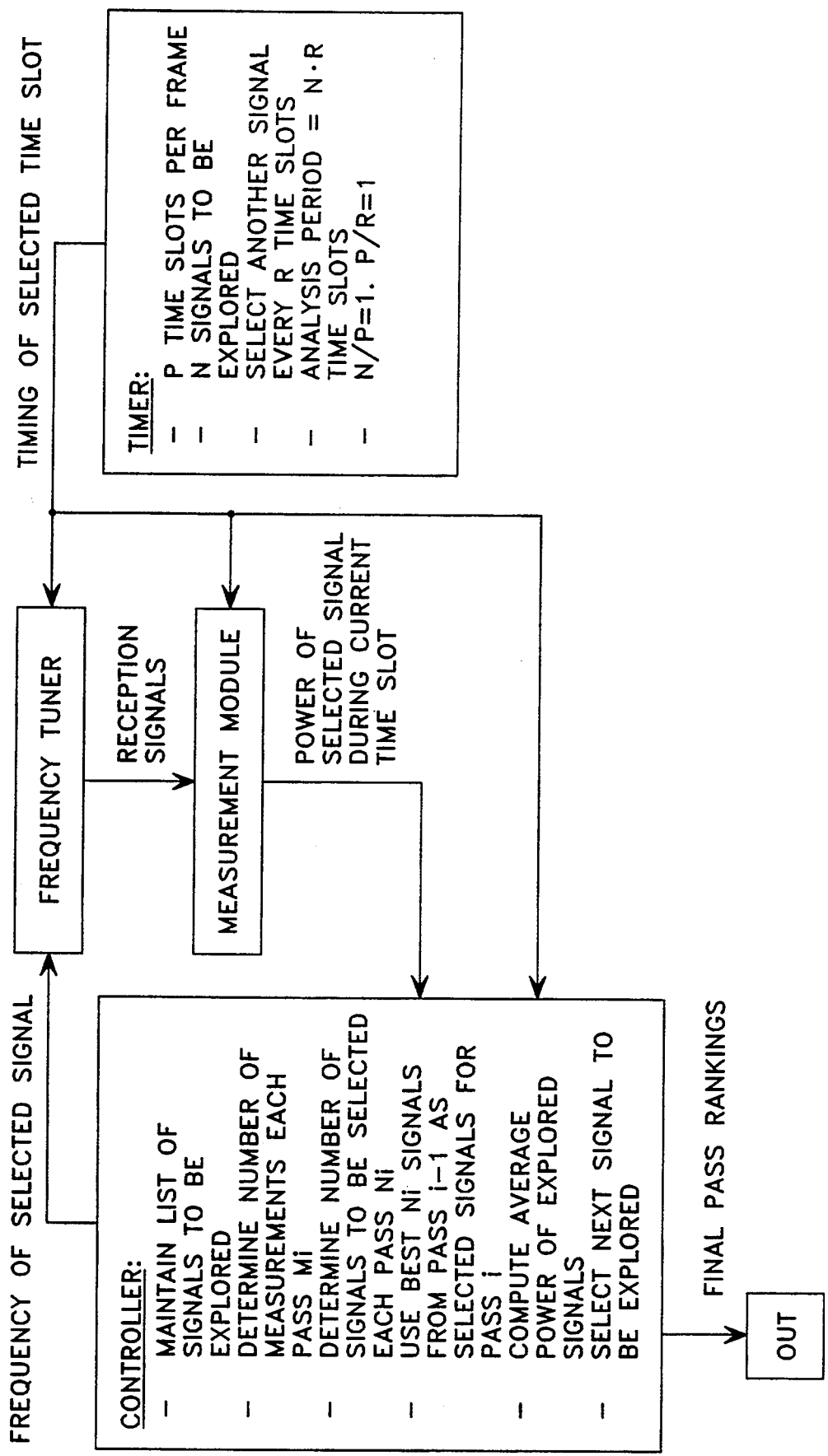

DEVICE FOR SELECTING RECEPTION SIGNALS AS A FUNCTION OF THEIR POWER

BACKGROUND OF THE INVENTION

The present invention relates to a device for selecting reception signals as a function of their power, such signals being identified by their frequency.

In the framework of the Pan European Digital Cellular Radiocommunications System known as the GSM system, terminals communicate by radio links with units connected to the public telephone network, these units being referred to as base stations. This system provides for 124 carriers of different frequency by means of which a terminal may send, and also provides for 124 carriers of different frequency again that a terminal can receive. Each carrier has a time-division structure and is formed by a periodic succession of frames each carrying eight equal time slots. Among a terminal's reception signals that are transferred by the carriers it is receiving, one particular signal, the broadcast signal, carries all the information allowing this terminal to enter into communication with the base station that is sending it.

The terminal needs to be able to identify the signal it is receiving with the highest strength since this most probably is the broadcast signal being sent by the base station to which it should connect itself, as will be explained below.

Moreover, the GSM system, by virtue of its operating mode, requires a terminal to store the identity and power of the strongest reception signals. As certain terminals are mobile, it is also established that the value of the power of a reception signal should be an average result from several measurements for example 8 spaced over time by a certain period, 10 milliseconds for example, thus making it possible to weight power variations at reception that are due to propagation conditions. In effect, a reception signal is the sum of several signals that have followed different paths, these latter signals, depending on the position of the mobile terminal, making a positive or a negative contribution to the received power.

One solution that has been suggested by the GSM system specifications consists in providing analysis means for selecting, over a measurement period, one time slot from each reception signal, this being done at the rate of appearance of the frame. This operation is repeated without interruption until the desired number of measurements has been obtained. Following the analysis means, power measuring means are provided which produce the values for the power of a signal as the average of the measurements made on the various time slots selected. The identity and the power of the selected signals are supplied by classification means which can access the various values that are established by the power measuring means.

This solution requires a large amount of time to identify the broadcast signal that is of interest, in other words the one for setting up the call, which is not desirable notably from the terminal user's point of view. Furthermore, the various measurements are made on time slots which occupy the same position in each one of the successive frames and this is not desirable for good discrimination of the broadcast signal. The base stations in effect permanently transmit this broadcast signal at maximum power, while in the majority of cases they transmit the other signals at a power that varies depending on the time slot, this power being notably adjusted as a function of the distance from the terminal for which such a signal is intended, and which always receives the same time slot. Thus, the average power calculated over several distinct time slots for a signal which is not the broadcast signal of the base station has a higher probability of being lower than the power of the broadcast signal from this base station than if average power was calculated from time slots occupying the same position.

The object of the present invention is hence to provide a device for selecting reception signals as a function of their power in which selection time is reduced and in which power measurements on a signal are carried out in distinct time slots.

The invention further provides supplementary means for further reducing this selection time when the powers of the various reception signals show great spread or dispersion.

The invention applies whatever type of selection is envisaged, whether identifying those signals that are received best for a determined number thereof is involved, or if this is done with respect to a determined threshold.

The invention is discussed in relation with the Pan European Digital Cellular Radiocommunications system in order to clearly present the inventive concept on the basis of a concrete case. The invention is not however limited to this field of application but applies each time that signals are being selected as a function of their power whenever such signals are structured into frames composed of time slots.

SUMMARY OF THE INVENTION

The device for selecting reception signals as a function of their power according to the invention applies when reception signals, identified by their frequency, are structured into frames made up by a number p of time slots. It includes analysis means providing during repetitive analysis periods, successive selection of at least one time slot of explored signals selected from among said reception signals in a determined order, the frequency of appearance of said selected time slots corresponding to a number r of time slots, said device further including power measuring means for producing the power of each one of said explored signals using as a basis measurements carried out on several selected time slots that correspond thereto, classification means for producing the identity of the selected signals in the form of explored signals having the highest power, said device further including means whereby the selected time slot of the first signal explored during an analysis period of rank less than or equal to p occupies a different position in the frame from the positions that it occupied during preceding analysis periods.

Moreover, in the device for selecting reception signals as a function of their power, in which said analysis periods having a constant duration which is equal to the product of the duration of a time slot, of the number r and of a number n, and with the number c of possible positions of said selected time slots within a frame being equal to the ratio between the number p and the highest common factor of this number p and of the number r, the number n is selected to have no common factor with the number c.

Advantageously, in the device for selecting reception signals as a function of their power, the numbers r and p have no common factor.

Moreover, in the device for selecting reception signals as a function of their power, the number n is equal to the number of signals explored.

Additionally, the device for selecting reception signals as a function of their power also produces the power of said selected signals.

In a first embodiment, the set of said reception signals is included in the set of said explored signals.

In a second embodiment of the device for selecting reception signals as a function of their power, command means produce during each one of said steps, the identity and the power of intermediate signals obtained by selecting said explored signals, the set of said signals explored during the first step including the set of said reception signals, and said intermediate signals, during the last step, being said selected signals, said signals explored during another step being said intermediate signals produced during the preceding step.

Furthermore, in the device for selecting received signals as a function of their power, the power of said selected signals is obtained on the basis of measurements carried out on all of the said selected time slots for the said signals that have appeared during the various steps.

The device is advantageously employed in the Pan European Digital Cellular Radio Communication system, the reception signals are 124 in number, and the numbers p, r, n are respectively equal to 8, 3 and 125.

BRIEF DESCRIPTION OF THE DRAWINGS

The various objects and features of the present invention will become more clear from the following description of examples of an embodiment provided by way of non-limiting examples and the attached Drawing, which is a functional block diagram of its major components.

DETAILED DESCRIPTION OF A PREFERRED EMBODIMENT

The analysis means are provided for receiving all of the reception signals each of which has a separate frequency, and for successively selecting one time slot from each one of these signals that is present in a table of the signals that are explored or polled. These analysis means generally comprise a frequency tuner the output frequency of which corresponds to the frequency of the signal that is to be explored, and which is designed so that the frequency of appearance of the selected time slots corresponds to a number r of time slots. Bearing in mind the constraints of output frequency switching time of this tuner, r will be chosen to be equal to 3 in the remainder of this description. Moreover, r is a number which has no common factor with the number p of time slots that constitute a frame, this being 8 in the present case, the result of this being that each one of the p time slots selected successively has a different position in the frame.

Generally speaking, the invention applies regardless of what the number r is and regardless of the number S of possible positions of the selected time slots within a frame, this number being equal to the ratio of p and the highest common factor of p and r.

The analysis means are periodically commanded in accordance with an analysis period during which they produce one time slot for each one of the signals present in the table of explored signals. The duration of an analysis period should be chosen to be a multiple of r, in other words should be equal to n.r time slots where n is a whole number. The number of successive analysis periods defines the number of measurements that will be used to calculate the powers of the various signals.

If $S_1$ stands for a time slot's position in the frame from which it originated, the time slot being selected from any one of the signals in the table of explored signals during an analysis period, and $S_2$ stands for the position of the time slot selected for this same signal during the following analysis period, then $S_2 - S_1 = n.r[p]$ where [p] means that the result of subtraction is adopted modulo p.

In the numerical example adopted, if this table includes all the reception signals which are 124 in number and if n is also equal to 124 then $S_2 - S_1 = 124 . 3 [8]$ $$S_2 - S_1 = 4$$

It results that the positions of the time slots selected during odd-numbered ranking analysis periods will be equal to $S_2$, while those positions not corresponding to odd-numbered ranking analysis periods will be equal to $S_1$. Regardless of the number of analysis periods, only two time slot positions will be considered. In order to increase this number of positions, the number n can be modified.

If we suppose that the number of measurements is equal to the number of time slots per frame, the ideal solution consists in providing analysis means whereby the various selected time slots of one and the same signal occupy all the possible positions within the frame. If we always say that p and r are numbers having no common factor, it is sufficient to choose the number n as having no common factor with p. Now suppose that k is a number such that a selected time slot of a given signal occupies the same position during an analysis period and during the nth following period, this being over a duration of n.r time slots $$(n.r) . k = k'.p$$

where k' is any whole number whatsoever. What is involved is finding the smallest value of k satisfying this equation, $$n.(r.k) = k'.p$$

n and p having no common factor, this gives:

$$r.k = p \text{ and } k' = y.n$$

where y is any whole number whatsoever.
as r and p have no con, non factor, this means:

$$k = p \text{ and } y = r$$

Thus the smallest value of k is p meaning that during p successive analysis periods a signal is in fact explored and analyzed on all of the time slots. In a similar way, it can be demonstrated that this does not occur if n and p are not numbers that have no common factor.

The demonstration can also be generalized to the case where p and r are not numbers having no con, non factor. Everything happens as if in effect we were dealing with a frame composed of c time slots, r having the value 1 in this case and hence having no common factor with c where, as mentioned previously, c is the number of possible positions of the selected time slots within a frame. A value for n will hence be chosen that has no con%mon factor with c in order to obtain all the possible selected time slot positions.

In the numerical example chosen for the purposes of illustration with r and p having no con, non factor, if n is chosen to be equal to the number of reception signals, in other words 124, n and p will have a con, non factor. In this case it is sufficient to fix a value of 125 for n.

As shown in the drawing, the measurement module is hence designed to receive the reception signals and to produce the identity and power of the selected signals. Control means supply this module with the table of signals that have to be explored, the number of measurements to be carried out for each signal and the number of signals to be selected as being the most powerful.

Without the invention, the analysis period is equal to a number of time slots which is the product of the number of selection signals and the number r.

The invention makes provision to modify this analysis period. In an advantageous embodiment given by way of example, each analysis period corresponds to the product of the number of signals explored and the number r. The control means produce the table of explored signals in such a manner that the number of these signals has no common factor with the number c.

In the table, a number of signals able to satisfy this condition is added to all of the reception signals, one advantageous solution consisting in duplicating at least one of these reception signals. In the numerical example adopted, in order to obtain n=125, it is sufficient to duplicate one reception signal.

In this case, the power measurement means will produce two power values for the same signal. One possibility consists in ignoring one of these two values and not transmitting it to the classification means. A second possibility consists in taking the average of these two values and supplying this to the classification means.

A further embodiment is also possible in which the analysis period is of longer duration than the time necessary to analyze the reception signals, part of the period then being idle time.

One additional feature of the invention concerns the case where the reception signals have powers that are very widely spread, in other words when they are distributed between a minimum power and a maximum power that are very different. This is precisely the situation that applies in the European GSM system: of the 124 signals received, the majority thereof have a power that is at least 10 decibels lower than the power of the sixteen best received signals.

Classification can then be carried out in two steps:

during a first step, the control means, like the case above, produce the table of explored signals using reception signals one of which is duplicated producing a first value M1 for the number of measurements to be made, for example 4, and a first number of signals to be selected, for example 33, and receive a first selection table that associates the identity and power of the 33 best received signals, during the second step, the control means produce the table of explored signals using the signals from the previously established selection table, and produce a second value M2 for the number of measurements to be made, for example 6, and a second number of signals to be selected, in the example chosen 16, the power measuring means establishing in this case the power values for the 33 signals present in the selection table by taking the average of the M1 measurements from the first step and the M2 measurements from the second step, thus making it possible to produce the selection table for the 16 best received signals.

This arrangement makes it possible to significantly reduce total processing time, for a total number of measurements equal to 10:

without this arrangement, this processing time is equal to the product of the number of explored signals (125), the number of measurements (10), the number r (3) and of the duration of a time slot (0.577 ms), amounting to about 2160 ms.

with this arrangement, the total processing time is the sum of the processing time of the first and second step:

$$125\times4\times3\times0.577+33\times6\times3\times0.577,$$

in other words about 1200 ms.

The number of steps which had been considered as two can obviously adopt other values without falling outside the scope of the invention. The necessary modifications needing to be made if it is desired to increase this number are within the abilities of those skilled in the art. They simply consist, for an intermediate step, of producing the table of explored signals using the selection table from the preceding step.

What is claimed is:

1. A device for selecting reception signals as a function of their power, said reception signals being identified by their frequency and being structured into frames, each frame consisting of a predetermined integral number p of time slots, each of the p time slots in a frame occupying a respective one of p different time slot positions, data concerning a group of said reception signals being stored in a corresponding table of explored signals, said device comprising:

analysis means for selecting during each analysis period of a succession of repetitive analysis periods at least one individual selected time slot in succession from each of said explored signals in said corresponding table of explored signals to thereby form a sequence of selected time slots, any two successive said selected time slots starting at instants separated by a period corresponding to a predetermined integral number r of time slots, measuring means for producing the power of each one of said explored signals using as a basis measurements carried out on several said selected time slots that correspond thereto, and control means for associating individual ones of said group of reception signals with particular entries in said table of explored signals and for identifying the explored signals having the highest power, wherein the selected time slots of a particular explored signal during any two successive analysis periods occupy different ones of said p time slot positions.

2. Device for selecting reception signals as a function of their power according to claim 1, wherein said analysis periods have a constant duration which is equal to the product of the duration of a time slot times the number r times a predetermined integral number n greater than or equal to the number of said explored signals, an integral number c of possible positions of said selected time slots within a frame is equal to the ratio between the number p and the highest common factor of this number p and of the number r, and the number one is the highest common factor of the number n and the number c.

3. Device for selecting reception signals as a function of their power according to claim 1, wherein the numbers r and p have no common factor greater than one.

4. Device for selecting reception signals as a function of their power according to claim 2, wherein the number n is equal to the number of explored signals.

5. Device for selecting reception signals as a function of their power according to claim 1, wherein it also produces the power of the signals identified as having the highest power.

6. Device for selecting reception signals as a function of their power according to claim 1, wherein the set of said reception signals is included in the set of said explored signals.

7. Device for selecting reception signals as a function of their power according to claim 1, wherein the analysis means carries out the selection of the selected time slots in at least two separate passes, and said control means produces during each one of said passes, the identity and the power of intermediate signals comprising a subgroup of the corresponding group of said explored signals, the corresponding group of said explored signals during a first pass including all said reception signals, and the group of said intermediate signals during a last pass including only said selected reception signals, said group of explored signals during a subsequent pass being said intermediate signals identified during a preceding pass.

8. Device for selecting received signals as a function of their power according to claim 7, wherein the power of said explored signals obtained on the basis of measurements carried out on all of the said selected time slots for the said signals that have appeared during the various passes.

9. Device for selecting reception signals as a function of their power according to claim 8, wherein said reception signals being 124 in number, the numbers p, r, n being respectively equal to 8, 3 and 125.

10. Method for selecting reception signals as a function of their power, said reception signals being identified by their frequency and being structured into frames, each frame consisting of a predetermined integral number p of time slots, each of the p time slots in a frame occupying a respective one of p time slot positions, comprising the steps:

creating a table of explored signals designating a plurality of selected signals from among said reception signals, exploring the selected signals during at least two successive analysis periods by successively selecting in a determined order during each analysis period at least one selected time slot from each of said plurality of selected signals such that the frequency of appearance of said selected time slots corresponds to an integral number r of time slots, and such that during any two successive analysis periods, the selected time slots occupy different time slot positions, measuring the power of each one of said selected signals during several corresponding selected time slots, and identifying the selected signals having the highest computed power.

11. The method of claim 10, wherein said reception signals are explored, measured, and identified in at least two passes each including at least two said analysis periods, with all said reception signals functioning as the selected signals during a first pass and the intermediate signals identified in a previous pass functioning as the selected signals in a subsequent pass.

* * * * *

UNITED STATES PATENT AND TRADEMARK OFFICE
CERTIFICATE OF CORRECTION

PATENT NO. : 5,353,288
DATED : October 4, 1994
INVENTOR(S) : O. Abdesselem et al It is certified that error appears in the above-identified patent and that said Letters Patent is hereby corrected as shown below:

On the title page: under item:[75]Inventors, should read--

Ouelid Abdesseiem, Paris; Lydie Desperben, Bois Colombes; Marie Pierre Popu, Clichy, all of France.
--.

Signed and Sealed this

Third Day of January, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,353,288
DATED : October 4, 1994
INVENTOR(S) : O. Abdesselem et al It is certified that error appears in the above-identified patent and that said Letters Patent is hereby corrected as shown below:

Col. 4, line 47, delete "r.k=p and k'=y.n" and insert --r.k=y.p and k'=y.n--.

Col. 4, line 50, delete "con, non" and insert --common--.

Col. 5, line 4, delete "con, non" and insert --common--.

Col. 5, line 2, "con, non" should read --common--.

Signed and Sealed this

First Day of August, 1995

Attest:

BRUCE LEHMAN

Attesting Officer

Commissioner of Patents and Trademarks